US012802277B2

(12) United States Patent
Cao et al.

(10) Patent No.: US 12,802,277 B2
(45) Date of Patent: Nov. 17, 2026

(54) COMPRESSED VIDEO STREAMING FOR MULTI-CAMERA SYSTEMS

(71) Applicant: Apple Inc., Cupertino, CA (US)

(72) Inventors: Frederic Cao, San Jose, CA (US); Xiaohua Yang, San Jose, CA (US); Hao Pan, Cupertino, CA (US); Giribalan Gopalan, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 18/477,256

(22) Filed: Sep. 28, 2023

(65) Prior Publication Data

US 2025/0111541 A1 Apr. 3, 2025

(51) Int. Cl.
*G06T 9/00* (2006.01)
*G06T 3/40* (2024.01)
*H04N 7/01* (2006.01)

(52) U.S. Cl.
CPC .................. *G06T 9/00* (2013.01); *G06T 3/40* (2013.01); *H04N 7/0117* (2013.01); *H04N 7/013* (2013.01)

(58) Field of Classification Search
CPC ........... G06T 3/40; G06T 9/00; H04N 19/597; H04N 7/0117; H04N 7/013
See application file for complete search history.

(56) References Cited

U.S. PATENT DOCUMENTS

2010/0271511 A1* 10/2010 Ma ......................... H04N 13/25 382/254
2015/0262380 A1* 9/2015 Grasmug ................ G06T 7/207 382/107
2016/0352791 A1* 12/2016 Adams .................... H04L 65/61
2017/0302719 A1* 10/2017 Chen ....................... H04L 65/61
2024/0333948 A1* 10/2024 Edpalm ................ H04N 19/105
2024/0373076 A1* 11/2024 Mallegowda .. H04N 21/234381

OTHER PUBLICATIONS

"Robust Distributed Multiview Video Compression for Wireless Camera Networks"—Yeo et al., IEEE Transactions on Image Processing, vol. 19, No. 4, Apr. 2010 (Year: 2010).*

* cited by examiner

*Primary Examiner* — Mainul Hasan
(74) *Attorney, Agent, or Firm* — Blank Rome LLP

(57) ABSTRACT

This disclosure describes techniques to concurrently capture several redundant (e.g., overlapping) video image streams on electronic devices having multiple image capture devices (e.g., on mobile devices having two or more digital video cameras). The techniques described herein advantageously capture at least one "compressed" video image stream, such that the overall multi-video image stream capture process uses significantly less power than capturing each stream independently in an "uncompressed" fashion. These techniques provide an electronic device with the ability to provide a user with more video streams that are of a higher frame rate and/or higher quality for a longer capture time-without exceeding the device's thermal limits. In particular, a "compressed" amount of image information may be processed and saved from at least one camera at capture time, and then deferred processing operations may be used to reconstruct any missing information and produce the higher frame rate/higher quality video image streams.

19 Claims, 4 Drawing Sheets

COMPRESSED VIDEO STREAMING FOR MULTI-CAMERA SYSTEMS

TECHNICAL FIELD

This disclosure relates generally to the field of digital image processing. More particularly, but not by way of limitation, it relates to techniques for performing compressed streaming of digital video images in multi-camera systems.

BACKGROUND

The advent of mobile, multi-function electronic devices, such as smartphones and tablet devices, has resulted in a desire for small form factor cameras capable of generating high levels of image and video quality for integration into such mobile, multi-function devices. Over the years, these multi-function devices have gone from being single-camera devices to being multi-camera devices-gaining additional cameras (with steadily increasing resolutions and frame rates) over time.

However, processing the larger amounts of data (e.g., pixel data) that these multiple cameras are able to concurrently capture requires additional power, which can quickly drain the (often) limited battery life on a mobile device. Further, heat dissipation on mobile devices is often passive and inefficient, which can cause mobile devices to quickly reach their thermal limits, which, in turn, reduces the amount of processing operations that the device can perform. Finally, capturing multiple concurrent video image streams from multiple cameras on a mobile phone can quickly consume large amounts of storage space (which is still relatively expensive, whether it is on-device or in the cloud) and/or necessitate the transmission of large amounts of data (e.g., via cellular networks, or the like), which can still take a long amount of time for large video file sizes.

Thus, it would be beneficial to have techniques that could allow electronic devices, e.g., multi-camera mobile devices, to capture high quality and intelligently-compressed video image steams from multiple cameras simultaneously, while operating within their thermal limits for longer periods of time.

SUMMARY

Techniques to concurrently capture several redundant (e.g., overlapping) video image streams on electronic devices having multiple image capture devices (e.g., on mobile devices having two or more digital video cameras). The techniques advantageously capture at least one "compressed" video image stream, such that the overall multi-video image stream capture process uses significantly less power than capturing each stream independently in an "uncompressed" fashion. These techniques provide an electronic device with the ability to provide a user with more video streams that are of a higher frame rate and/or higher quality for a longer capture time—without exceeding the device's thermal limits. In particular, a "compressed" amount of image information may be processed and saved from at least one camera at capture time, and then deferred processing operations may be used to reconstruct any missing information and produce the higher frame rate/higher quality video image streams.

As such, devices, methods, and non-transitory computer readable media are disclosed herein to perform compressed streaming of digital video images in multi-camera systems.

In one embodiment, a method of digital image processing is disclosed, the method comprising: encoding a first video image stream captured by a first image capture device of an electronic device, wherein: (a) the first video image stream is captured at a first frame rate and has a first field of view (FOV), (b) at least a first portion of images in the first video image stream are captured at a first resolution, and (c) at least a second portion of images in the first video image stream are captured at a second resolution that is lower than the first resolution. The method may proceed by also encoding a second video image stream captured by a second image capture device of the electronic device, wherein: (d) the second video image stream is captured concurrently with the first video image stream, (e) the second video image stream is captured at a second frame rate and has a second FOV that at least partially contains the first FOV, (f) the second frame rate is greater than the first frame rate, and, optionally, (g) at least some images in the second video image stream are captured at a resolution higher than the second resolution.

According to some embodiments, e.g., as part of a deferred processing operation after the real-time capture of the first and second video image streams, the method may further comprise: decoding the first video image stream; decoding the second video image stream; and reconstructing an enhanced version of the first video image stream based, at least in part, on information obtained from the decoded second video image stream, wherein the enhanced version of the first video image stream has at least one of: an increased frame rate as compared to the first frame rate, or an increased resolution as compared to the second resolution.

According to some such embodiments, reconstructing the enhanced version of the first video image stream further comprises: using optical flow (OF) information computed for the second video image stream to derive OF information for the corresponding portions of the first video image stream.

According to other such embodiments, reconstructing the enhanced version of the first video image stream further comprises: reconstructing based, at least in part, on the derived OF information, a plurality of additional video images for the enhanced version of the first video image stream, wherein, after the reconstruction of the plurality of additional video images, the enhanced version of the first video image stream has the second frame rate.

According to some embodiments, reconstructing the enhanced version of the first video image stream further comprises: computing an amount of disparity between the first image capture device and the second image capture device.

According to some embodiments, reconstructing the enhanced version of the first video image stream further comprises: upscaling at least one image in the first video image stream having the second resolution to have the first resolution in the enhanced version of the first video image stream.

According to other embodiments, the method may further comprise: encoding a third video image stream captured by a third image capture device of the electronic device, wherein: (h) the third video image stream is captured at a third frame rate and has a third FOV, (i) at least a first portion of images in the third video image stream are captured at a third resolution, (j) at least a second portion of images in the third video image stream are captured at a fourth resolution that is lower than the third resolution, (k) the third video image stream is captured concurrently with the first and second video image streams, (l) the second FOV at least partially contains the third FOV, and (m) the second frame rate is greater than the third frame rate.

According to some such embodiments, the method may further comprise: decoding the first video image stream; decoding the second video image stream; decoding the third video image stream; reconstructing an enhanced version of the first video image stream based, at least in part, on information obtained from the decoded second video image stream, wherein the enhanced version of the first video image stream has at least one of: an increased frame rate as compared to the first frame rate, or an increased resolution as compared to the second resolution; and reconstructing an enhanced version of the third video image stream based, at least in part, on information obtained from the decoded second video image stream, wherein the enhanced version of the third video image stream has at least one of: an increased frame rate as compared to the third frame rate, or an increased resolution as compared to the fourth resolution.

According to other embodiments, the second FOV fully contains the first FOV (and/or the third FOV).

According to some embodiments, the method may further comprise: storing the enhanced version of the first video image stream, the second video image stream, and (if one exists) the enhanced version of the third video image stream, together in a single video file object.

According to some embodiments, the first resolution comprises a 4K resolution or an 8K resolution, and the second resolution comprises a high-definition (HD) or 1080p resolution (or an even lower resolution).

According to other embodiments, the first frame rate is 30 frames per second (fps), and the second frame rate is 60 fps, 90 fps, 120 fps, or 240 fps.

According to still other embodiments, at least one of: the first resolution, the second resolution, the first frame rate, or the second frame rate are determined dynamically when the second image capture device begins to capture the second video image stream, e.g., based on scene content and/or device processing/thermal conditions.

According to some embodiments, the method may further comprise: playing back the single video file object, wherein, during the playback, at least one video image is played back from each of: the enhanced version of the first video image stream, the second video image stream, and (if one exists) the enhanced version of the third video image stream.

According to yet other embodiments, the encoding of at least one of the first video image stream and the second video image stream and/or the reconstruction of the enhanced version of the first video image stream may comprise: utilizing one or more machine learning (ML)-based models.

Various non-transitory computer readable media embodiments are disclosed herein. Such computer readable media are readable by one or more processors. Instructions may be stored on the computer readable media for causing the one or more processors to perform any of the techniques disclosed herein.

Various programmable electronic devices are also disclosed herein, in accordance with the program storage device embodiments enumerated above. Such electronic devices may include one or more image capture devices (e.g., with differing image capture characteristics, such as resolutions and/or frame rates), such as optical image sensors/camera units; a display; a user interface; one or more processors; one or more sensors (e.g., ambient light sensors, flicker sensors, inertial measurement units (IMUs), etc.); and a memory coupled to the one or more processors. Instructions may be stored in the memory, the instructions causing the one or more processors to execute instructions in accordance with the various techniques disclosed herein.

DETAILED DESCRIPTION

Figure 1:
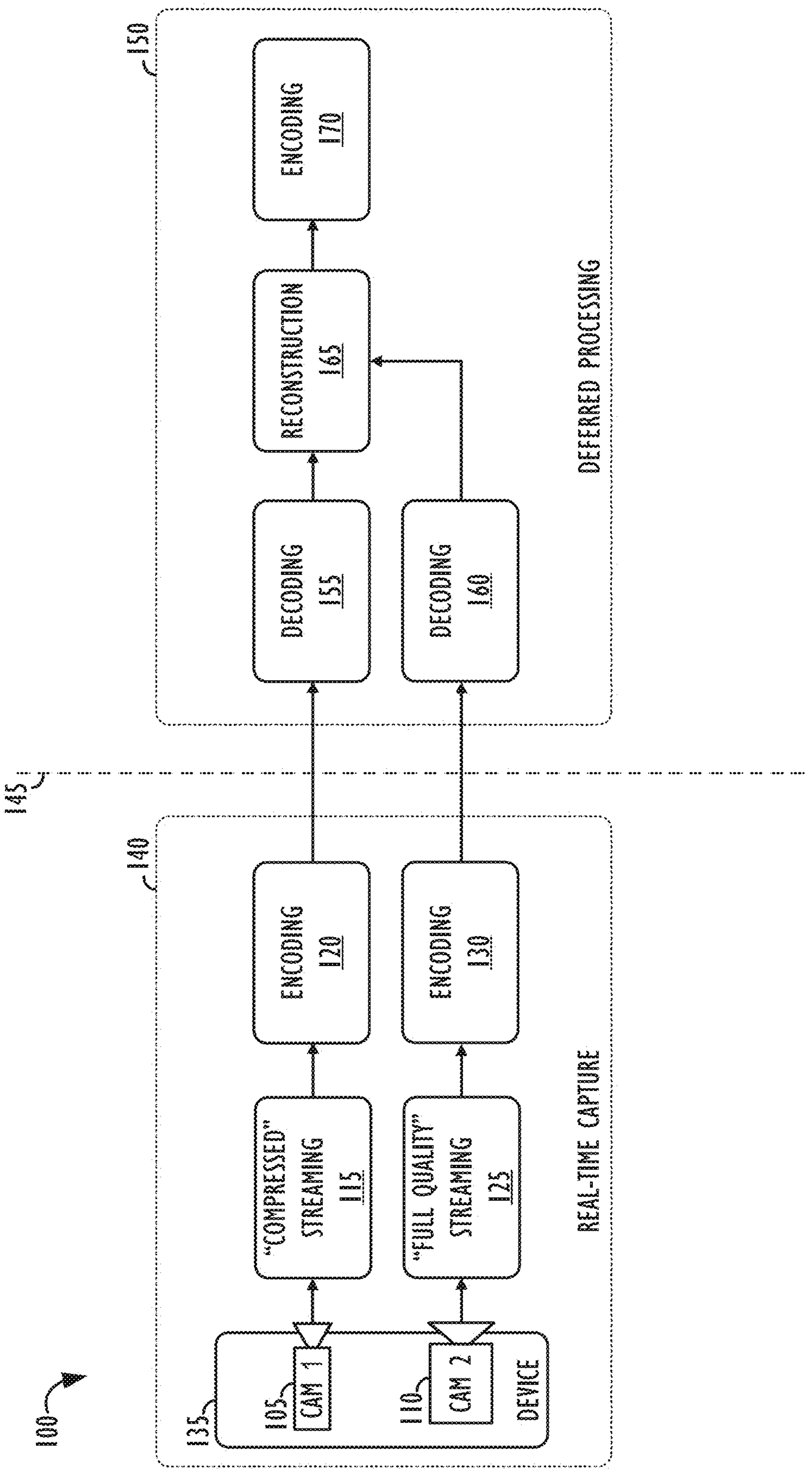
FIG. 1 illustrates an exemplary process flow for performing compressed streaming of digital video images in a multi-camera system, according to one or mor embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Problem Background

In traditional video encoding operations, video image frames are typically fully processed and sent to an encoder before being saved to memory. The encoder is able to compute some predictions of the amount and direction of motion of objects within the captured scene between video image frames (e.g., in the form of motion vectors (MVs)). These MVs, also refereed to herein as optical flow (OF) data can have a lower resolution than the original video image stream (e.g., a single MV representing each 8 pixel by 8 pixel block of pixels from an image in the video image stream).

In typical encoding operations, only a small percentage of the captured video image frames need to be full saved. Such frames are also referred to as "I-frames." While, other video image frames (also referred to as "P-frames") may be "predicted" from the neighboring I-frame and the corresponding MVs. In this way, the encoding operation is able to reduce the total amount of data that needs to be stored to represent (and reproduce) the video image stream.

As may now be appreciated, typical video encoding processing is performed in addition to regular video processing operations. Thus, while encoding video may save storage space and reduce the amount of write operations to memory, it does not save processing time or processing power-because it does not reduce the overall number of pixels that initially need to be captured and processed by an image sensor before the encoder can determine what portions of the captured image pixel data can be discarded.

As introduced above, some users of digital image capture devices may desire to capture more than one digital video image stream concurrently, e.g., to be able to dynamically change between different angles/camera views of a given scene during playback or post-processing operations, i.e., despite the fact that the video was recorded in real-time without the user having to make the decisions of which angles/camera to cut between as the events being recorded were transpiring in the real-world. It may also be desirable to concurrently capture video image streams of the scene using multiple image capture devices, e.g., with different FOVs, resolutions, and/or image capture characteristics, e.g., so that the user could have multiple versions of the video to send to different recipients and/or to use in different contexts, such as stereo video capture for head mounted displays (HMDs), etc.

Thus, as will now be explained in greater detail, the inventors of the present disclosure have developed new techniques to leverage the redundancy (i.e., FOV overlap) between the different video image streams being captured concurrently to provide greater video compression during video image streaming operations, while still retaining the ability to reconstruct high quality and high frame rate output video image streams and prolong the amount of time that a multi-camera electronic device can capture multiple video image streams concurrently before reaching power and/or thermal limits. In particular, by reducing or "compressing" the amount of information streamed on at least some of the multiple video cameras at capture time (e.g., in terms of frame rate and/or resolution), and then reconstructing any missing video image information from the compressed video image stream(s) via deferred processing operations (e.g., at a later time, i.e., when the device is no longer capturing the video image streams), these goals may be achieved.

Exemplary Process Flow for Performing Compressed Streaming in Multi-Camera Systems Turning now to FIG. 1, an exemplary process flow 100 for performing compressed streaming of digital video images in a multi-camera system is illustrated, according to one or more embodiments.

First, in process flow 100, dashed line rectangle 140 indicates operations that may take place during real-time image capture operations. An exemplary electronic device 135 (e.g., a mobile phone, or the like) may comprise two or more image capture devices, e.g., a first camera 105 and a second camera 110. In some embodiments, first camera 105 and second camera 110 may be pointed in essentially the same direction, and thus share partially (if not completely) redundant, i.e., overlapping, FOVs. For example, second camera 110 may have a wider FOV than first camera 105, but the FOV of first camera 105 may be largely centered (or otherwise contained within) the larger FOV of second camera 110. As will be explained more detail below, when different image capture devices of an electronic device share substantial FOV overlap, the techniques described herein may be able to take advantage of the similarity in the captured content between the image capture devices, e.g., in order to share computed OF information related to one video image stream with another video image stream captured by a different device camera.

Returning now to second camera 110 (also referred to herein as the "wide FOV" camera in example process flow 100), upon initiation of video recording operations, e.g., by a user of exemplary electronic device 135, second camera 110 may begin "full quality" streaming operations at block 125. As used herein, the notion of "full quality" means that second camera 110 is not intentionally capturing at a reduced frame rate and/or resolution level, e.g., the camera is not intentionally compromising on video image capture quality in an effort to save processing and/or thermal resources for electronic device 135. At block 130, any desired video encoding operations may be applied to the "full quality" video image stream captured by second camera 110.

Moving now to first camera 105 (also referred to herein as the "narrow FOV" camera in example process flow 100), upon initiation of the video recording operations, e.g., by a user of exemplary electronic device 135, first camera 105 may concurrently begin "compressed" streaming operations at block 115, as will be described in greater detail below, with reference to FIG. 2. As used herein, the notion of "compressed" video streaming means that first camera 105 is intentionally set to capture video images at a reduced frame rate and/or resolution level, e.g., in an effort to save processing and/or thermal resources for electronic device 135. At block 120, any desired video encoding operations may be applied to the "compressed" video image stream captured by first camera 105.

Next, dashed line 145 represents a transition in the process flow 100 between real-time capture operations 140 and deferred processing operations 150. For example, in some embodiments, the encoded video image streams from blocks 120 and 130 may be stored to a device memory.

Turning next to dashed line rectangle 150, operations that may be deferred until after the real-time image capture operations shown in dashed line box 140 are illustrated. For example, the operations shown in dashed line box 150 may take place immediately after the real-time capture operations, after a set delay, at a certain time of day, or on-demand by a user, etc.

Beginning at decoding block 160, the encoded video image stream 130 from wide FOV second camera 110 may be decoded. Similarly, at decoding block 155, the encoded video image stream 120 from narrow FOV first camera 105 may be decoded. At reconstruction block 165, an enhanced version of the "compressed" video image stream 115 from narrow FOV first camera 105 may be created based, at least in part, on information (e.g., OF information) obtained from the decoded "full quality" video image stream at block 160. According to some embodiments, the enhanced version of the "compressed" video image stream 115 is enhanced at reconstruction block 165 to have at least one of: an increased frame rate (e.g., via the generation or temporal interpolation of new image frames, so that the enhanced version of the "compressed" video image stream has a frame rate equal to the frame rate of the "full quality" video image stream 125), or an increased resolution (e.g., via an upscaling operation or "super-resolution" operations performed on any image frames of the "compressed" video image stream 115 that have a resolution lower than the images captured in the "full quality" video image stream 125). For example, according to some embodiments, reconstructing the enhanced version of the "compressed" video image stream 115 further comprises: using the dense OF information computed for the "full quality" video image stream 125 in order to derive OF information for (captured and/or to-be-reconstructed) images of the enhanced version of the "compressed" video image stream being generated at reconstruction block 165. For example, OF information may be applied to the "compressed" video image stream 115 based on a timestamp correspondence between the video images of the two concurrently captured video images streams 115/125.

Finally, at block 170 the enhanced version of the "compressed" video image stream 115 may be encoded via any desired encoding operations. As may now be appreciated, the original full quality" video image stream 125 and the newly-generated enhanced version of the "compressed" video image stream 115 may be stored together in a single video file object and made available to a user. Thus, the user has the benefit of two different "full quality" video image streams, with the FOV/characteristics of two different image capture devices-without the electronic device ever having to stream video images from both image capture devices at "full quality" levels concurrently, thereby preserving additional device battery life and helping the device to avoid surpassing its thermal limits during multi-camera video capture operations.

Compressed Streaming of Digital Video Images Example

Figure 2:
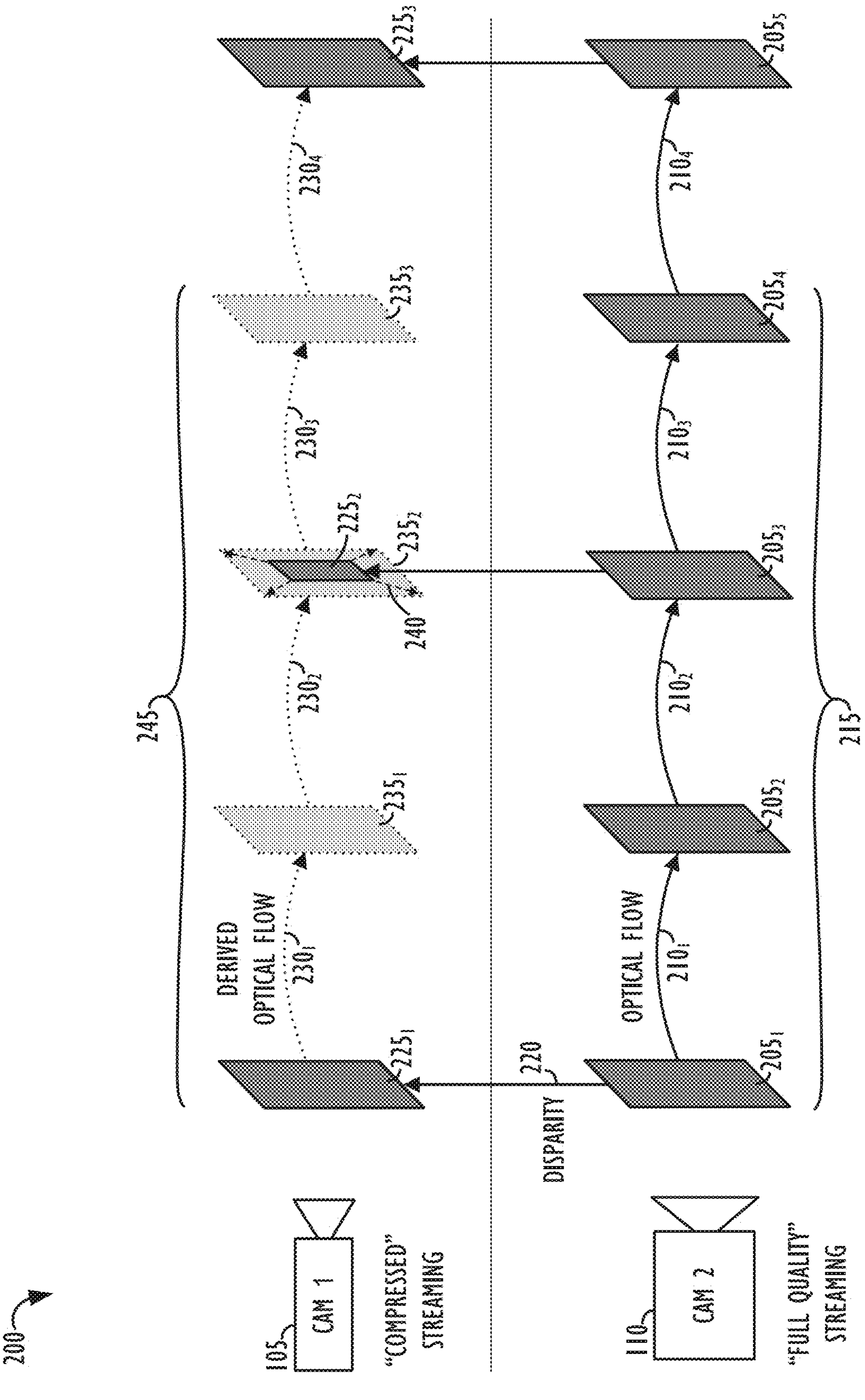
FIG. 2 illustrates an example of compressed streaming of digital video images in a multi-camera system, according to one or more embodiments.

Turning now to FIG. 2, an example of compressed streaming of digital video images in a multi-camera system 200 is shown, according to one or more embodiments. Exemplary first camera 105 and second camera 110 originally introduced with FIG. 1 are shown again in FIG. 2, along with their respective exemplary captured digital video image streams, i.e., "compressed" streaming in the case of first camera 105 and "full quality" streaming in the case of second camera 110.

In example system 200, the second camera 110 may capture a "full quality" video image stream having a higher frame rate than first camera 105, and the second camera 110 may also capture images at a higher resolution than (at least some of) the images captured by first camera 105. The video image stream 205 captured by second camera 110 are represented by darkly-shaded images: 205$_1$, 205$_2$, 205$_3$, 205$_4$, 205$_5$, and so forth. For example, the images of video image stream 205 may be captured at "full" resolution (e.g., a 4K resolution) and at a "full" frame rate of 60 fps. For the purposes of example system 200, an exemplary period 215 of four images 205 captured by second camera 110 will be discussed. It is to be understood that the pattern of interrelationships between the video image stream 205 and the video image stream 225 captured by first camera 105 (as will be described in further detail below) may repeat in an analogous fashion for every four images 205 captured by second camera 110.

Similarly, in example system 200, the first camera 105 may capture a "compressed" video image stream having a lower frame rate than second camera 110, and the first camera 105 may also capture at least some of its images 225 at a lower resolution than the images captured by second camera 110. The video image stream 225 captured by first camera 150 are represented by darkly-shaded images: 225$_1$, 225$_2$, 225$_3$, and so forth. For example, the images of video image stream 225 may be captured at a rate of 30 fps (i.e., with half the frame rate of second camera 110) and with alternating resolution levels, e.g., the images of video image stream 225 may be captured alternating between "full" resolution (e.g., a 4K resolution) images, as shown in images 225$_1$ and 225$_3$, and "lower" resolution (e.g., an HD or 1080p resolution) images, as shown in images 225$_2$, i.e., to further reduce the amount of pixel image data that must be processed from the image sensor of the first camera 105.

For the purposes of example system 200, an exemplary period 245 of two images 225 captured by first camera 105 will be discussed. It is to be understood that the pattern of interrelationships between the video image stream 225 and the video image stream 205 captured by second camera 110 may repeat in an analogous fashion, with every two images 225 captured by first camera 105 corresponding in time to every four images 205 captured by second camera 110.

According to some embodiments, high quality optical flow information 210 (e.g., motion vectors for every pixel or cluster of pixels) may be computed between each successive image 205 captured by second camera 110. For example, optical flow information 210$_1$ may represent the movement of corresponding pixels (or clusters of pixels) between images 205$_1$ and 205$_2$, optical flow information 210$_2$ represents the movement of corresponding pixels between images 205$_2$ and 205$_3$, optical flow information 210$_3$ represents the movement of corresponding pixels between images 205$_3$ and 205$_4$, and optical flow information 210$_4$ represents the movement of corresponding pixels between images 205$_4$ and 205$_5$.

As discussed above with regard to reconstruction block 165 of FIG. 1, according to some embodiments, optical flow information 210 from second camera 110 may be ported over to the image stream capture by first camera 105 and used to derive (based, at least in part, on disparity estimates between the respective image capture devices) optical flow information 230 between successive images 225 captured by first camera 105 (and/or and between an image 225 captured by first camera 105 and an image 235 that will be generated or synthesized during the creation of the reconstructed or "enhanced" version of the video image stream captured by first camera 105, e.g., in an effort to increase the effective frame rate of the video stream captured by first camera 105 to match the frame rate of the "full quality" video image stream natively captured by second camera 110, as will now be discussed).

For example, derived optical flow information 230$_1$ may represent the predicted movement of corresponding pixels (or clusters of pixels) between image 225$_1$ and a generated image 235$_1$ (i.e., based, at least in part on optical flow information 210$_1$ and the estimated disparity 220 between the first camera 105 and second camera 110), while derived optical flow information 230$_2$ represents the movement of corresponding pixels between generated image 235$_1$ and image 225$_2$, derived optical flow information 230$_3$ represents the movement of corresponding pixels between image 225$_2$ (and/or generated full resolution image 235$_2$, as will be discussed below) and generated image 235$_3$, and derived optical flow information 230$_4$ represents the movement of corresponding pixels between generated image 235$_3$ and image 225$_3$. In some implementations, a first approximation of the derived OF between images 225$_1$ and 235$_1$ (i.e., 230$_1$) assumes the scene depth doesn't change between image 205$_1$ and 205$_2$. Therefore, the disparity between images 205$_1$ and 205$_2$ is the disparity between images 205$_1$ and 225$_1$ (i.e., 220), which is then warped (i.e., ported over) by the OF information 210$_1$.

Note that, as shown in FIG. 2, according to some embodiments, e.g., if the resolution of one or more of the images captured in the "compressed" video image stream does not match the "full" resolution of images in the "full quality" video image stream for a given electronic device, an upscaling operation 240 may also be applied to such lower resolution images during deferred processing operations, such that they will likewise have the full resolution in the enhanced version of the compressed captured video image stream.

For example, in FIG. 2, first camera 105 captures at half the frame rate of second camera 110, but it also captures every other image at a reduced resolution as compared to that of second camera 110 (e.g., at an HD resolution, as compared to a full 4K or 8K resolution, or the like). As such, and as described above, according to some embodiments, a lower resolution image, such as image $225_2$ may be upscaled (e.g., via upscaling operation 240) in order to generate a full resolution image $235_2$ that may be used in the enhanced version of the compressed captured video image stream (which, as may now be understood will include all captured images 225, as well as all interstitial generated images 235). (It is to be understood that, in other embodiments, the images captured by second camera 110 need not all be captured at the full or highest resolution that the second camera 110 is capable of capturing at. Indeed, the images captured by the second camera 110 may still be relevant and useful for the techniques disclosed herein due to the optical flow information that may be computed from them, even if they have a resolution equal—or comparable to—the resolution of some of the images captured by the first camera 105.)

As may be appreciated, the compressed streaming techniques described herein may also be extended to more than two concurrently-capturing video cameras. In each case, at least some amount of the information from the narrower FOV camera(s) is not actually captured, and is instead reconstructed in deferred processing operations, thereby saving additional power and data bandwidth at capture image, and allowing such electronic devices the capability of concurrently capturing multiple video image streams that will each (after deferred processing) be of a high quality and a high frame rate.

Exemplary Compressed Digital Video Image Streaming Methods

Figure 3:
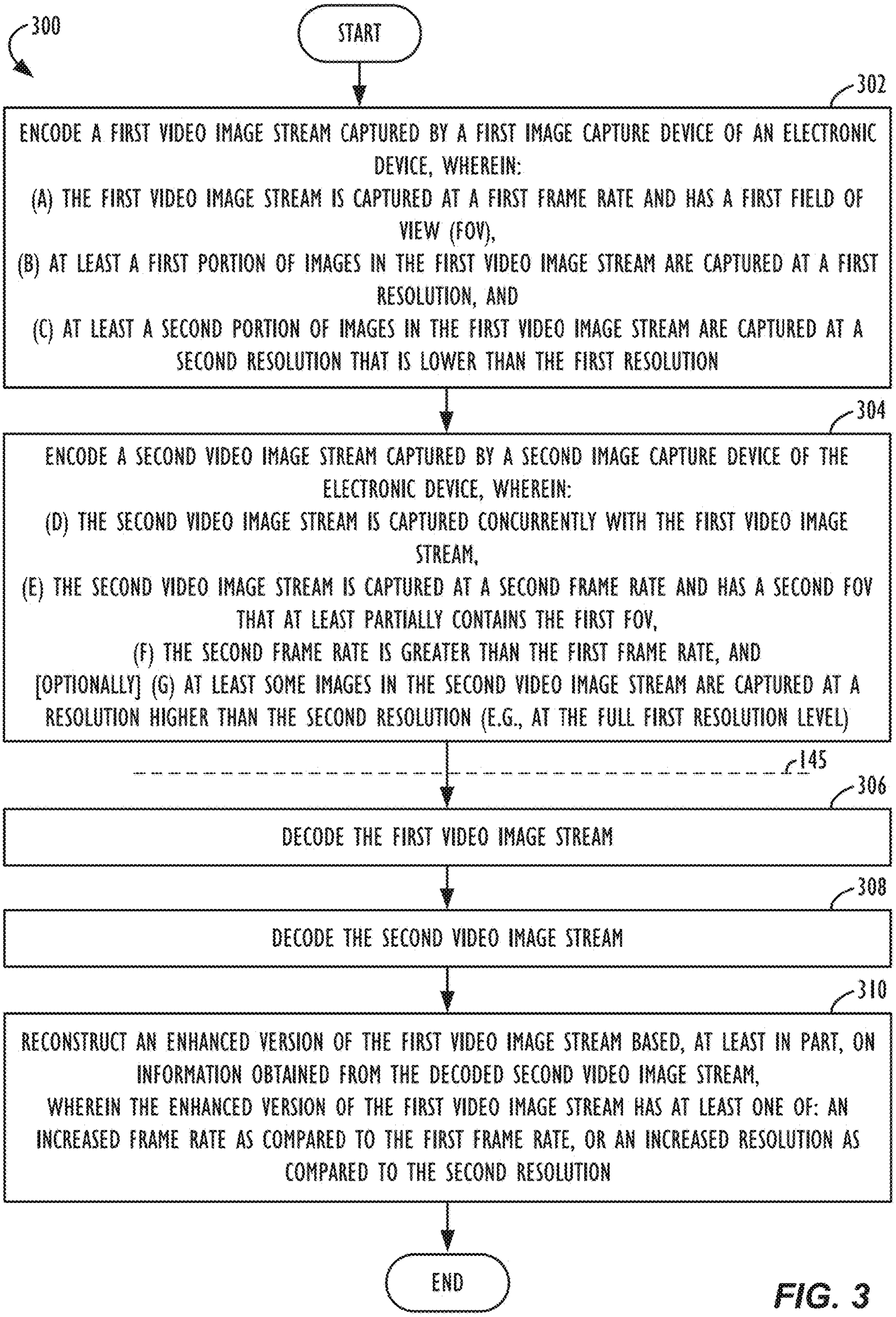
FIG. 3 is a flow chart illustrating a method of performing compressed streaming of digital video images in multi-camera systems, according to one or more embodiments.

Turning now to FIG. 3, a flow chart illustrating a method 300 of performing compressed streaming of digital video images in multi-camera systems is shown, according to one or more embodiments. Method 300 may begin at Step 302 by an electronic device (e.g., a mobile phone comprising two or more images capture devices, such as digital video cameras) may encode a first video image stream captured by a first image capture device of an electronic device, wherein: (a) the first video image stream is captured at a first frame rate and has a first field of view (FOV), (b) at least a first portion of images in the first video image stream are captured at a first resolution, and (c) at least a second portion of images in the first video image stream are captured at a second resolution that is lower than the first resolution.

Next, at Step 304, the method 300 may encode a second video image stream captured by a second image capture device of the electronic device, wherein: (d) the second video image stream is captured concurrently with the first video image stream, (e) the second video image stream is captured at a second frame rate and has a second FOV that at least partially contains the first FOV, (f) the second frame rate is greater than the first frame rate, and, optionally, (g) at least some images in the second video image stream are captured at a resolution higher than the second resolution (e.g., some or all of the images in the second video image stream may be captured with the full first resolution, or some intermediate resolution level between the first and second resolution levels, etc.).

For example, in some embodiments, the first resolution may comprise a 4K resolution (i.e., 3,840 pixels by 2,160 pixels) or an 8K resolution (i.e., 7,680 pixels by 4,320 pixels), and wherein the second resolution comprises a high-definition (HD) or 1080p resolution (i.e., 1,920 pixels by 1,080 pixels). In some embodiments, the first frame rate may be 30 frames per second (fps), and the second frame rate is 60 fps, 90 fps, 120 fps, or 240 fps, etc. The frame rates of the first image capture device and second image capture device may preferably be multiples of one another to aid in the identification of "corresponding" video image frames between video image streams, but that is not strictly necessary. In some cases, the second FOV may fully contain the first FOV, i.e., thereby providing maximum redundancy in the portions of the scene captured by the first image capture device and the second image capture device (subject to the amount of parallax between the first and second image capture devices).

According to some embodiments, the encoding of at least one of the first video image stream or the second video image stream may utilizing a machine learning (ML)-based video compression model. It is to be understood that any compatible encoding modules may be employed according to the techniques disclosed herein, e.g., as shown in blocks 120 and 130 of FIG. 1.

As shown by dashed line 145 (originally introduced above with reference to FIG. 1), between block 304 and block 306 represents a division between certain steps of method 300 prior to block 306 that may be performed during real-time image capture operations, and other steps (i.e., those after dashed line 145) that may optionally be performed as deferred processing operations, e.g., after a set delay, at a certain time of day, or on-demand by a user, etc.

Next, at Step 306, the method 300 may proceed by decoding the first video image stream. At Step 308, the method 300 may proceed by decoding the second video image stream. It is to be understood that, decoding the video image data at Steps 306 and 308 may preferably be performed as a deferred processing operation, for which the amount of pixel data that was captured and processed during the real-time image capture operations may already have been successfully reduced, e.g., via the various techniques described herein.

At Step 310, the method 300 may proceed by reconstructing an enhanced version of the first video image stream based, at least in part, on information (e.g., OF information) obtained from the decoded second video image stream, wherein the enhanced version of the first video image stream has at least one of: an increased frame rate as compared to the first frame rate (e.g., equal to the second frame rate), or an increased resolution as compared to the second resolution (e.g., with all video images having a resolution equal to the second resolution). For example, according to some embodiments, reconstructing the enhanced version of the first video image stream further comprises: using the OF information computed for the second video image stream to derive OF information for (captured and/or to-be-reconstructed) images of the first video image stream, e.g., based on a timestamp correspondence between the video images of the second video image stream and the first video image stream, as described above with reference to FIG. 2. According to some embodiments, the reconstruction of the enhanced version of the first video image stream may further comprise the use of one or more trained ML models, e.g., ML models trained to synthesize "missing" image information (and/or entire missing images), based on "existing" image information and a learned understanding of how image data typically changes from frame to frame in a captured video image stream.

According to some embodiments, reconstructing the enhanced version of the first video image stream further comprises: reconstructing based, at least in part, on the derived OF information, a plurality of additional video images for the enhanced version of the first video image stream, wherein, after the reconstruction of the plurality of additional video images, the enhanced version of the first video image stream has the second frame rate. For example, if the second video image stream was captured at 60 fps and the first video image stream was captured at 30 fps, then one additional image may be reconstructed between each original frame captured in the first video image stream, e.g., based at least in part on derived OF information and the known disparity information between the first image capture device and second image capture device. In some cases, the method may also upscale any images in the first video image stream that have a resolution smaller than the second resolution to have the second resolution in the enhanced version of the first video image stream.

According to still other embodiments, the electronic device may further comprise a third image capture device, e.g., a third digital video camera. In such cases, the method 300 may further include encoding a third video image stream captured by a third image capture device of the electronic device, wherein: (h) the third video image stream is captured at a third frame rate and has a third FOV, (i) at least a first portion of images in the third video image stream are captured at a third resolution, (j) at least a second portion of images in the third video image stream are captured at a fourth resolution that is lower than the third resolution, (k) the third video image stream is captured concurrently with the first and second video image streams, (l) the second FOV at least partially contains the third FOV, and (m) the second frame rate is greater than the third frame rate.

For example, the third image capture device could have a third FOV that is even narrower than both the first and second FOVs. The third frame rate could, likewise, be less than both the first and second frame rates. Then, according to some embodiments, similar deferred processing operations could be applied to the third video image stream to reconstruct an enhanced version of the third video image stream based, at least in part, on information obtained from the decoded second video image stream, wherein the enhanced version of the third video image stream has at least one of: an increased frame rate as compared to the third frame rate (e.g., equal to the second frame rate), or an increased resolution as compared to the fourth resolution (e.g., with all video images having a resolution equal to the third resolution).

According to some embodiments, the second video image stream and any other enhanced video image streams reconstructed from video image streams captured by other image capture devices of the electronic device may be stored together in a single video file object. Once the video file object exists, it may be played back, e.g., by a user, in an appropriate playback application. According to some such embodiments, during the playback, at least one video image is played back from each of: the enhanced version of the first video image stream, the enhanced version of the third video image stream (if it exists), and the second video image stream. For example, a user may be able to "dynamically zoom" into (or out of) the video file object as it is being played back, with the playback application seamlessly switching between video image streams included in the video file object, based on the FOV of the scene that the user has currently indicated a desire to see during playback. Such a multi-video stream file object would also allow a user more editing flexibility during post-processing operations to cut between different angles/camera views of a given scene that was recorded in real-time-without the user ever having had to make the decisions of which angles/camera to cut between as the events being recorded were transpiring in the real-world for the first time.

If so desired, at least one of: the first resolution, the second resolution, the first frame rate, or the second frame rate are determined dynamically when the second image capture device begins to capture the second video image stream, e.g., to adapt dynamically to scene content, device processing resources, or remaining thermal budget, etc.

According to some embodiments, because standard transcoding techniques may be used with the compressed streams, the enhanced video image streams may be shared for playback with any device.

According to still other embodiments, if the narrower FOV camera has a higher spatial resolution, it can also be used to enhance the spatial resolution of the overlapping portion of the center of the wider FOV camera.

Exemplary Electronic Computing Devices

Figure 4:
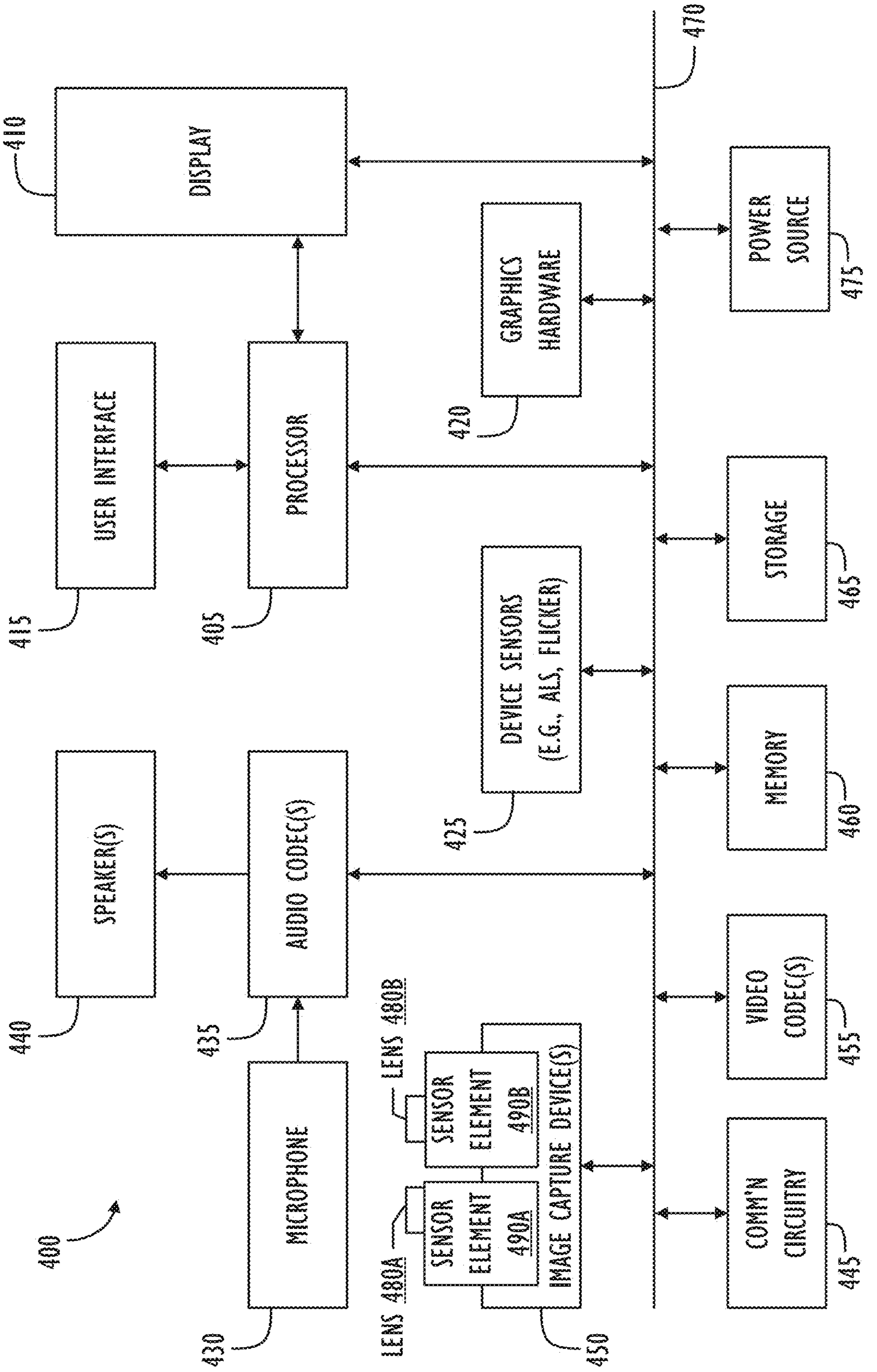
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer, inertial measurement unit, and/or gyroscope), microphone 430, audio codec(s) 435, speaker(s) 440, communications circuitry 445, image capture device(s) 450, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the capture and/or processing of digital video images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular image frame(s) that the user would like to capture (e.g., by clicking on a physical or virtual button at the moment the desired image frame is being displayed on the device's display screen).

In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip (SOC) such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 450 may comprise one or more camera units configured to capture images, e.g., images which may be processed to generate enhanced versions of said captured images, e.g., in accordance with this disclosure. Image capture device(s) 450 may include two (or more) lens assemblies 480A and 480B, where each lens assembly may have a separate focal length (as well as various other different image capture properties, such as capture rate, resolution, etc., as discussed above). For example, lens assembly 480A may have a shorter focal length relative to the focal length of lens assembly 480B. Each lens assembly may have a separate associated sensor element, e.g., sensor elements 490A/490B. Alternatively, two or more lens assemblies may share a common sensor element. Image capture device(s) 450 may capture still and/or video images. Output from image capture device(s) 450 may be processed, at least in part, by video codec(s) 455 and/or processor 405 and/or graphics hardware 420, and/or a dedicated image processing unit or image signal processor incorporated within image capture device(s) 450. Images so captured may be stored in memory 460 and/or storage 465.

Memory 460 may include one or more different types of media used by processor 405, graphics hardware 420, and image capture device(s) 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein. Power source 475 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 400.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of compressed streaming of digital video images, comprising:

encoding a first video image stream captured by a first image capture device of an electronic device, wherein:

the first video image stream is captured at a first frame rate and has a first FOV, at least a first portion of images in the first video image stream are captured at a first resolution, and at least a second portion of images in the first video image stream are captured at a fourth resolution that is lower than the first resolution;

decoding the first video image stream; and reconstructing an enhanced version of the first video image stream based, at least in part, on information obtained from the decoded first video image stream, wherein the enhanced version of the first video image stream has at least one of: an increased frame rate as compared to the first frame rate, or an increased resolution as compared to the fourth resolution.

2. The method of claim 1, further comprising:

encoding a second video image stream captured by a second image capture device of the electronic device, wherein:

the second video image stream is captured at a second frame rate and has a second field of view (FOV), at least a first portion of images in the second video image stream are captured at a second resolution, and at least a second portion of images in the second video image stream are captured at a third resolution that is lower than the second resolution; and encoding a third video image stream captured by a third image capture device of the electronic device, wherein:

the third video image stream is captured concurrently with the second video image stream, the third video image stream is captured at a third frame rate and has a third FOV that at least partially contains the second FOV, and the third frame rate is greater than the second frame rate, wherein the first video image stream is captured concurrently with the second and third video image streams, wherein the third FOV at least partially contains the first FOV, and wherein the third frame rate is greater than the first frame rate.

3. The method of claim 2, further comprising:

decoding the second video image stream;

decoding the third video image stream; and reconstructing an enhanced version of the second video image stream based, at least in part, on information obtained from the decoded third video image stream, wherein the enhanced version of the second video image stream has at least one of: an increased frame rate as compared to the second frame rate, or an increased resolution as compared to the third resolution.

4. The method of claim 2, wherein the third FOV fully contains the second FOV.

5. The method of claim 2, wherein the third FOV fully contains the second FOV and the first FOV.

6. The method of claim 2, wherein the second resolution comprises a 4K resolution or an 8K resolution, and wherein the third resolution comprises, at most, a 1080p resolution.

7. The method of claim 2, wherein the second frame rate is 30 frames per second (fps), and wherein the third frame rate is 60 fps, 90 fps, 120 fps, or 240 fps.

8. The method of claim 2, wherein at least one of: the second resolution, the third resolution, the second frame rate, or the third frame rate are determined dynamically when the third image capture device begins to capture the third video image stream.

9. The method of claim 2, wherein: at least some images in the third video image stream are captured at a resolution higher than the third resolution.

10. The method of claim 3, wherein reconstructing the enhanced version of the second video image stream further comprises:

using optical flow (OF) information computed for the third video image stream to derive OF information for the second video image stream.

11. The method of claim 3, wherein reconstructing the enhanced version of the second video image stream further comprises:

computing an amount of disparity between the second image capture device and the third image capture device.

12. The method of claim 3, wherein reconstructing the enhanced version of the second video image stream further comprises:

upscaling at least one image in the second video image stream having the third resolution to have the second resolution in the enhanced version of the second video image stream.

13. The method of claim 3, further comprising:

storing the enhanced version of the second video image stream and the third video image stream together in a single video file object.

14. The method of claim 3, further comprising:

storing the enhanced version of the second video image stream, the enhanced version of the first video image stream, and the third video image stream together in a single video file object.

15. The method of claim 10, wherein reconstructing the enhanced version of the second video image stream further comprises:

reconstructing based, at least in part, on the derived OF information, a plurality of additional video images for the enhanced version of the second video image stream, wherein, after the reconstruction of the plurality of additional video images, the enhanced version of the second video image stream has the third frame rate.

16. The method of claim 13, further comprising:

playing back the single video file object, wherein, during the playback, at least one video image is played back from each of: the enhanced version of the second video image stream and the third video image stream.

17. The method of claim 14, further comprising:

playing back the single video file object, wherein, during the playback, at least one video image is played back from each of: the enhanced version of the second video image stream, the enhanced version of the first video image stream, and the third video image stream.

18. An electronic device, comprising:

a memory;

a first image capture device; and one or more processors operatively coupled to the memory, wherein the one or more processors are configured to execute instructions causing the one or more processors to:

perform the method of claim 1.

19. A non-transitory computer readable medium comprising computer readable instructions executable by one or more processors to: perform the method of claim 1.

* * * * *